(12) United States Patent
Gagnon et al.

(10) Patent No.: US 8,188,439 B2
(45) Date of Patent: May 29, 2012

(54) GAMMA RAY DETECTOR ELEMENTS WITH VARIABLE LIGHT GUIDE THICKNESS

(75) Inventors: Daniel Gagnon, Twinsburg, OH (US); Kent Burr, Buffalo Grove, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 12/621,691

(22) Filed: Nov. 19, 2009

(65) Prior Publication Data
US 2011/0114845 A1 May 19, 2011

(51) Int. Cl.
*G01T 1/202* (2006.01)
(52) U.S. Cl. ....................................................... 250/366
(58) Field of Classification Search ............. 250/363.02, 250/363.04, 363.1, 366, 368, 370.11
See application file for complete search history.

(56) References Cited

U.S. PATENT DOCUMENTS

| | | | | |
|---|---|---|---|---|
| 4,687,921 A | * | 8/1987 | Kojola | 250/207 |
| 4,700,074 A | * | 10/1987 | Bosnjakovic | 250/363.02 |
| 5,032,728 A | * | 7/1991 | Chang et al. | 250/363.04 |
| 5,138,166 A | * | 8/1992 | Makino et al. | 250/368 |
| 5,834,782 A | * | 11/1998 | Schick et al. | 250/370.11 |
| 5,861,628 A | * | 1/1999 | Genna et al. | 250/368 |
| 6,479,827 B1 | * | 11/2002 | Hamamoto et al. | 250/370.11 |
| 2005/0017182 A1 | * | 1/2005 | Joung et al. | 250/363.1 |

OTHER PUBLICATIONS

M.E. Casey, et al., A Multicrystal Two Dimensional BGO Detector System for Positron Emission Tomography, Computer Technology and Imaging 215 Center Park Drive Knoxville, Tennessee, IEEE Transactions on Nuclear Science, vol. 33, No. 1, Feb. 1986, p. 460-463.
Chang L. Kim, et al., High Spatial Resolution Detector using an 8×8 MLS crystal array and a Quad Anode Photo-multiplier, IEEE, 2002 Number of pp. 5.
A. Kuhn, et al., Design of a Lanthanum Bromide Detector for TOF PET, Manuscript receivied Oct. 29, 2003, IEEE Number of pp. 5.
S. Surti, et al. Optimizing the Performance of a PET Detector using Discrete GSO Crystals on a Continuous Lightguide, IEEE Transactions on Nuclear Science, vol. 47, No. 3, Jun. 2000, p. 1030-1036.

* cited by examiner

*Primary Examiner* — David P. Porta
*Assistant Examiner* — Marcus Taningco
(74) *Attorney, Agent, or Firm* — Oblon, Spivak, McClelland, Maier & Neustadt, L.L.P.

(57) ABSTRACT

A gamma ray detector module that includes at least one crystal element arranged in a plane, a plurality of light sensors arranged to cover the at least one crystal element and to receive light emitted from the at least one crystal element, and a light guide arranged between the at least one crystal element and the light sensors, the light guide being optically connected to the at least one crystal element. Further, the light guide includes a narrow portion that positions at least one light sensor of the plurality of light sensors closer to the at least one crystal element than other light sensors of the plurality of light sensors. In addition, the light guide may include an angled recessed portion that positions another light sensor at an oblique tilt angle with respect to the plane of the at least one crystal element.

9 Claims, 9 Drawing Sheets

GAMMA RAY DETECTOR ELEMENTS WITH VARIABLE LIGHT GUIDE THICKNESS

BACKGROUND OF THE INVENTION

1. Field of the Invention

Embodiments of the present invention generally relates to a gamma ray detector, and in particular, to a positron tomography detector having a variable light guide thickness and/or tilted light sensors.

2. Discussion of the Background

The use of positron emission tomography (PET) is growing in the field of medical imaging. In PET imaging, a radiopharmaceutical agent is introduced into the object to be imaged via injection, inhalation, or ingestion. After administration of the radiopharmaceutical, the physical and bio-molecular properties of the agent will cause it to concentrate at specific locations in the human body. The actual spatial distribution of the agent, the intensity of the region of accumulation of the agent, and the kinetics of the process from administration to eventually elimination are all factors that may have clinical significance. During this process, a positron emitter attached to the radiopharmaceutical agent will emit positrons according to the physical properties of the isotope, such as half-life, branching ratio, etc.

The radionuclide emits positrons, and when an emitted positron collides with an electron, an annihilation event occurs, wherein the positron and electron are destroyed. Most of the time, an annihilation event produces two gamma rays (at 511 keV) traveling at substantially 180 degrees apart.

By detecting the two gamma rays, and drawing a line between their locations, i.e., the line-of-response (LOR), one can retrieve the likely location of the original disintegration. While this process will only identify a line of possible interaction, by accumulating a large number of those lines, and through a tomographic reconstruction process, the original distribution can be estimated. In addition to the location of the two scintillation events, if accurate timing (within few hundred picoseconds) is available, a time-of-flight (TOF) calculation can add more information regarding the likely position of the event along the line. Limitations in the timing resolution of the scanner will determine the accuracy of the positioning along this line. Limitations in the determination of the location of the original scintillation events will determine the ultimate spatial resolution of the scanner, while the specific characteristics of the isotope (e.g., energy of the positron) will also contribute (via positron range and co-linearity of the two gamma rays) to the determination of the spatial resolution the specific agent.

The collection of a large number of events creates the necessary information for an image of an object to be estimated through tomographic reconstruction. Two detected events occurring at substantially the same time at corresponding detector elements form a line-of-response that can be histogrammed according to their geometric attributes to define projections, or sinograms to be reconstructed. Events can also be added to the image individually.

The fundamental element of the data collection and image reconstruction is therefore the LOR, which is the line traversing the system-patient aperture. Additional information can be obtained regarding the location of the event. First, it is known that, through sampling and reconstruction, the ability of the system to reconstruct or position a point is not space-invariant across the field of view, but is better in the center, slowly degrading toward the periphery. A point-spread-function (PSF) is typically used to characterize this behavior. Tools have been developed to incorporate the PSF into the reconstruction process. Second, the time-of-flight, or time differential between the arrival of the gamma ray on each detector involved in the detection of the pair, can be used to determine where along the LOR the event is more likely to have occurred.

The above described detection process must be repeated for a large number of annihilation events. While each imaging case must be analyzed to determine how many counts (i.e., paired events) are required to support the imaging task, current practice dictates that a typical 100-cm long, FDG (fluorodeoxyglucose) study will need to accumulate several hundred million counts. The time required to accumulate this number of counts is determined by the injected dose of the agent and the sensitivity and counting capacity of the scanner.

PET imaging systems use detectors positioned across from one another to detect the gamma rays emitting from the object. Typically a ring of detectors is used in order to detect gamma rays coming from each angle. Thus, a PET scanner is typically substantially cylindrical to be able to capture as much radiation as possible, which should be, by definition, isotropic. The use of partial rings and rotation of the detector to capture missing angles is also possible, but these approaches have severe consequences for the overall sensitivity of the scanner. In a cylindrical geometry, in which all gamma rays included in a plane have a chance to interact with the detector, an increase in the axial dimension has a very beneficial effect on the sensitivity or ability to capture the radiation. Thus, the best design is that of a sphere, in which all gamma rays have the opportunity to be detected. Of course, for application to humans, the spherical design would have to be very large and thus very expensive. Accordingly, a cylindrical geometry, with the axial extent of the detector being a variable, is realistically the starting point of the design of a modern PET scanner.

Once the overall geometry of the PET scanner is known, another challenge is to arrange as much scintillating material as possible in the gamma ray paths to stop and convert as many gamma rays as possible into light. In order to be able to reconstruct the spatio-temporal distribution of the radio-isotope via tomographic reconstruction principles, each detected event will need to be characterized for its energy (i.e., amount of light generated), its location, and its timing. Most modern PET scanners are composed of several thousand individual crystals, which are arranged in modules and are used to identify the position of the scintillation event. Typically crystal elements have a cross section of roughly 4 mm×4 mm. Smaller dimensions and non-square sections are also possible. The length or depth of the crystal will determine how likely the gamma ray will be captured, and typically ranges from 10 to 30 mm. The detector module is the main building block of the scanner.

PET imaging relies on the conversion of gamma rays into light through fast and bright scintillation crystals. After determining the interaction position in the scintillator and time pairing of individual events, the location of the annihilation process can be recreated. These actions require very fast components—detector and electronics—and they also require excellent signal to noise ratio. With high quality electronics, the signal to noise ratio is mainly determined by the inherent Poisson statistics involved in the detection process. Detecting more photons will result in improved signal-to-noise-ratio, and, therefore, better spatial and timing resolution. No improvement in detector design and electronics can compensate for significant loss of light in the detection process. The fraction of the total amount of light collected (relative to the amount created in the scintillator) is a good measure of the efficiency of the design. So to maximize the amount of light collected, one would try to get the light sensor as close as possible to the scintillation crystal and avoid reflections and other edge effects. This would then force the arrangement to be large array detector with short distance between crystal and sensor.

As described above, a PET imaging system is more than just a counter and, in addition to detecting the presence of a scintillation event, the system must identify its location. By properly documenting how light is being distributed to the multiple light sensors, it is possible to assign an event location for any given set of sensor responses. Light therefore needs to be distributed to multiple sensors. In order to accomplish an adequate light distribution so that enough sensors detect a fraction of the light, it may be necessary to increase the thickness of the light guide or the space between the crystals and the sensor. Such a geometry would directly affect the light distribution, but would also negatively impact total light collection.

The technology of photomultiplier tubes has evolved over the years to provide faster and more uniform response. With pico-second requirements for time-of-flight scanners, one modification of the original tube design is the incorporation of a concave photocathode. FIG. 1 illustrates two examples of such tubes including the curved photocathode. The curved photocathode has the effect of balancing the time the electrons take to go from the cathode to the first dynode. As the travel time of the electron is much slower than the light photon through the additional length of glass, the overall result is clearly a tighter time of arrival at the dynode from all electrons, irrespective of the location of origin on the photocathode. Conventional PET detectors typically utilize all the same size photosensor tubes on one assembly, with the assembly consisting of a flat crystal/light guide combination over which the sensor is arranged in a regular pattern, e.g., square or hexagonal compact.

Thus, conventional PET detectors aim for the best average set of conditions and geometry for the detector, but do not compensate for locally varying light distributions, including edge effects and reflections. In addition, it should be clear from the profile of the ToF-capable tubes shown in FIG. 1 that a flat light guide fails to properly use all of the photocathode surface when light comes from the side.

Further, conventional PET detector designs fail to recognize that a uniform layout of the photosensors is only appropriate for a uniform layout of the scintillator array. The only geometry allowing each and every photosensor to be used in the same way would be a complete 4π, spherical geometry. However, once edges, modules, or any other sources of asymmetry, e.g., different types of tubes over the crystal array, are introduced, the contribution of each photosensor to the overall detection process needs to be analyzed.

SUMMARY OF THE INVENTION

According to one embodiment of the present invention, there is provided a gamma ray detector module, comprising: (1) at least one crystal element arranged in a plane; (2) a plurality of light sensors arranged to cover the at least one crystal element and configured to receive light emitted from the at least one crystal element; and (3) a light guide arranged between the at least one crystal element and the plurality of light sensors, the light guide being optically connected to the at least one crystal element, wherein the light guide includes a narrow portion that positions a first light sensor of the plurality of light sensors closer to the at least one crystal element than other light sensors of the plurality of light sensors.

According to one aspect of the present invention, the first light sensor has a first size, and a second light sensor adjacent to the first light sensor has a second size, so that the first and second light sensors cover different-sized portions of the at least one crystal element, the first size being larger than the second size.

According to another aspect of the present invention, the light guide further includes an angled recessed portion that positions the second light sensor at an oblique tilt angle with respect to the first light sensor and the plane of the at least one crystal element.

According to still another aspect of the present invention, the first light sensor is positioned closer to the plane of the at least one crystal element by a distance d, wherein d is based on a difference in sizes of the photocathodes of the first and second light sensors.

According to still another aspect of the present invention, the at least one crystal element includes a plurality of optically isolated crystal elements.

According to another embodiment of the present invention, there is provided a gamma ray detector module, comprising: (1) at least one crystal element arranged in a plane; (2) a plurality of light sensors arranged to cover the at least one crystal element and configured to receive light emitted from the array of crystal elements; and (3) a light guide arranged between the at least one crystal element and the plurality of light sensors, the light guide being optically connected to the at least one crystal element, wherein the light guide includes a first angled recessed portion that positions a first light sensor of the plurality of light sensors at a first oblique tilt angle with respect to the plane of the at least one crystal element.

According to another aspect of the present invention, the light guide includes a second angled recessed portion that positions a second light sensor adjacent to the first light sensor at a second oblique tilt angle with respect to the plane of the at least one crystal element.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
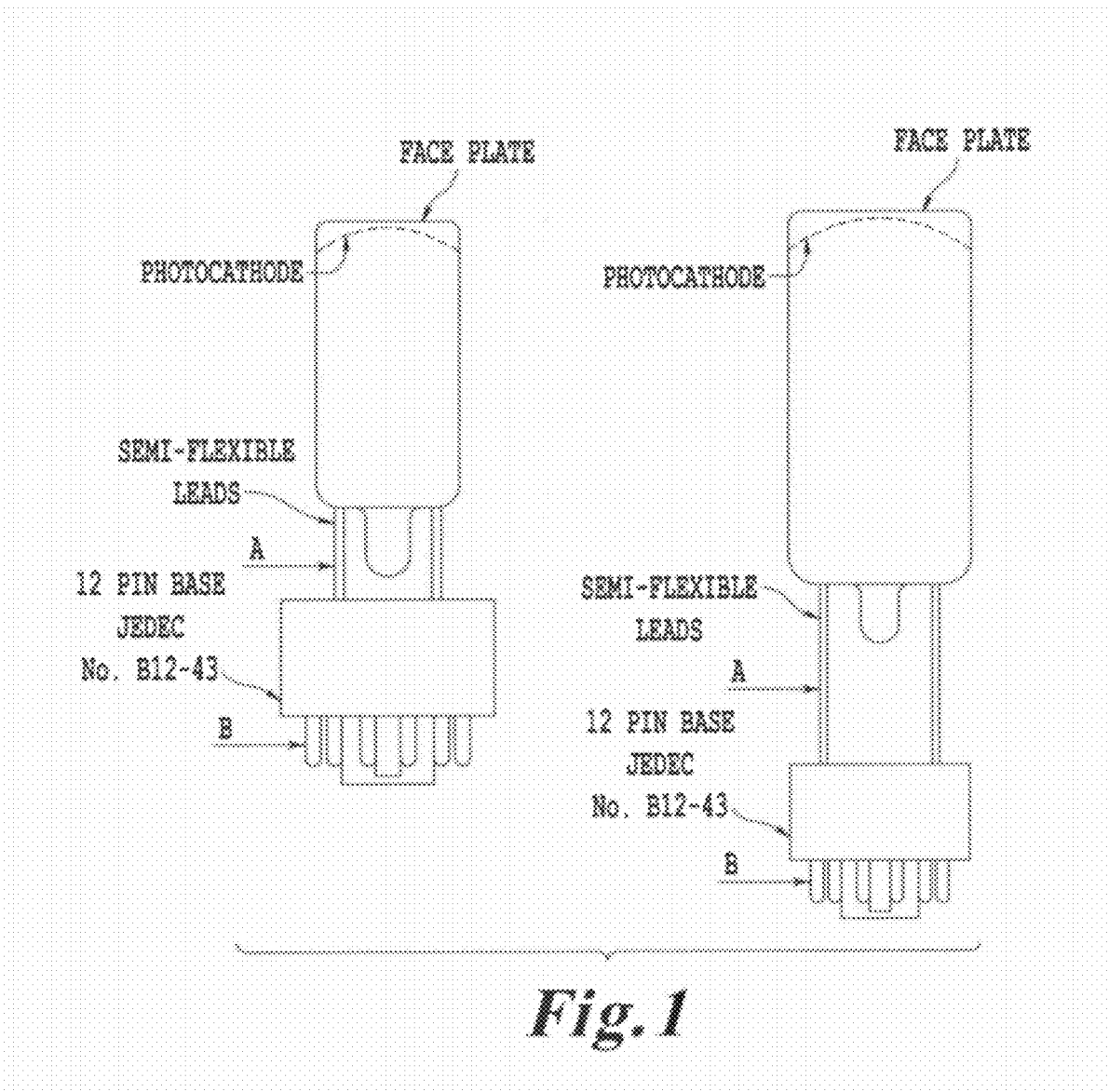
FIG. 1 illustrates photomultiplier tubes with curved photocathodes.
Figure 2A:
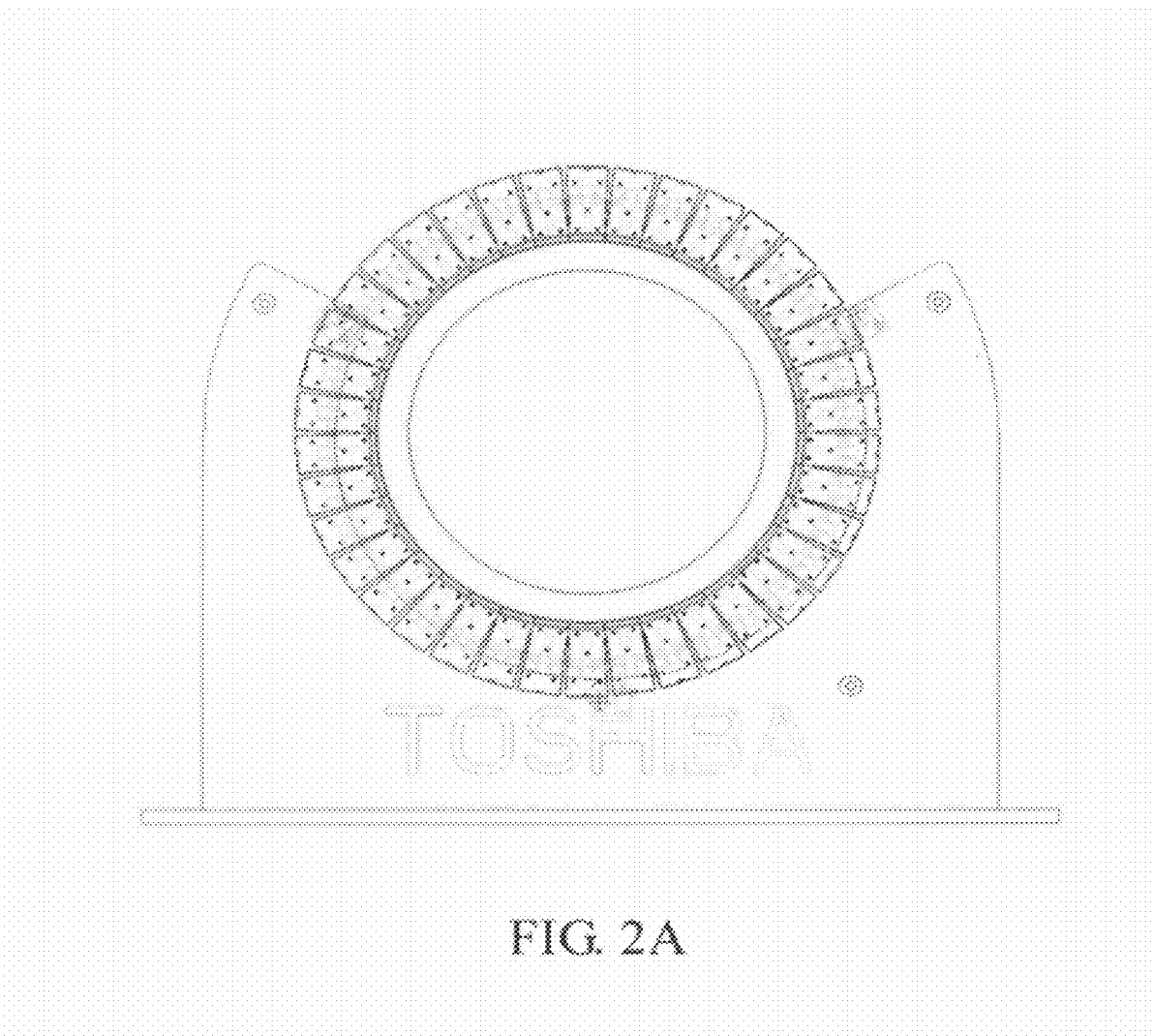
FIGS. 2A-2C illustrate a PET detector ring design that includes a plurality of detector modules.
Figure 2B:
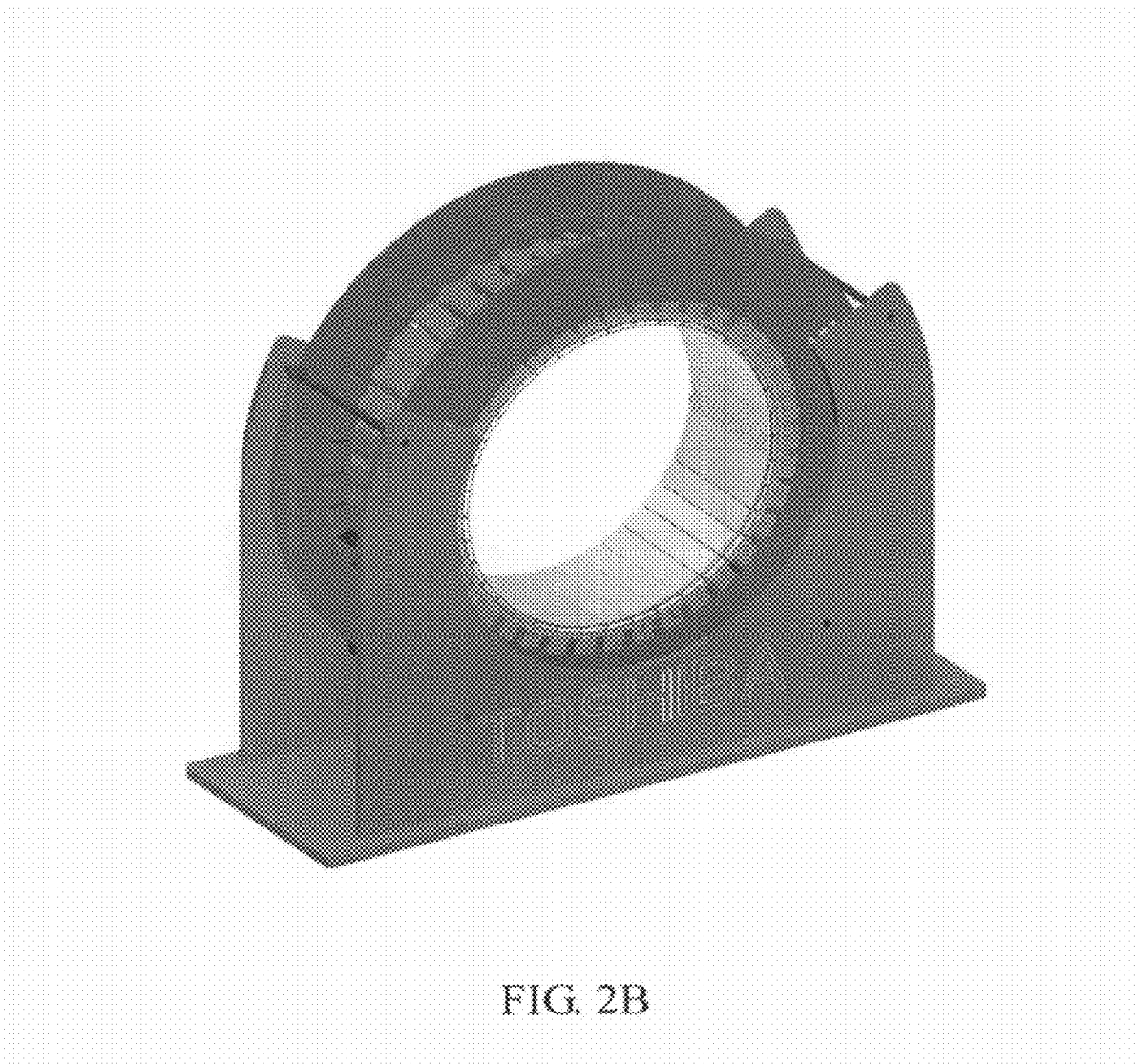

Referring now to the drawings, wherein like reference numerals designate identical or corresponding parts throughout the several views, FIGS. 2A and 2B illustrate a PET scanner design according to one embodiment of the present invention. As shown in FIGS. 2A and 2B, a detector ring is comprised of a number of rectangular detector modules. According to one embodiment, the detector ring comprises 40 detector modules. In another embodiment, 48 modules are used to create a larger bore size for the scanner.

Figure 2C:
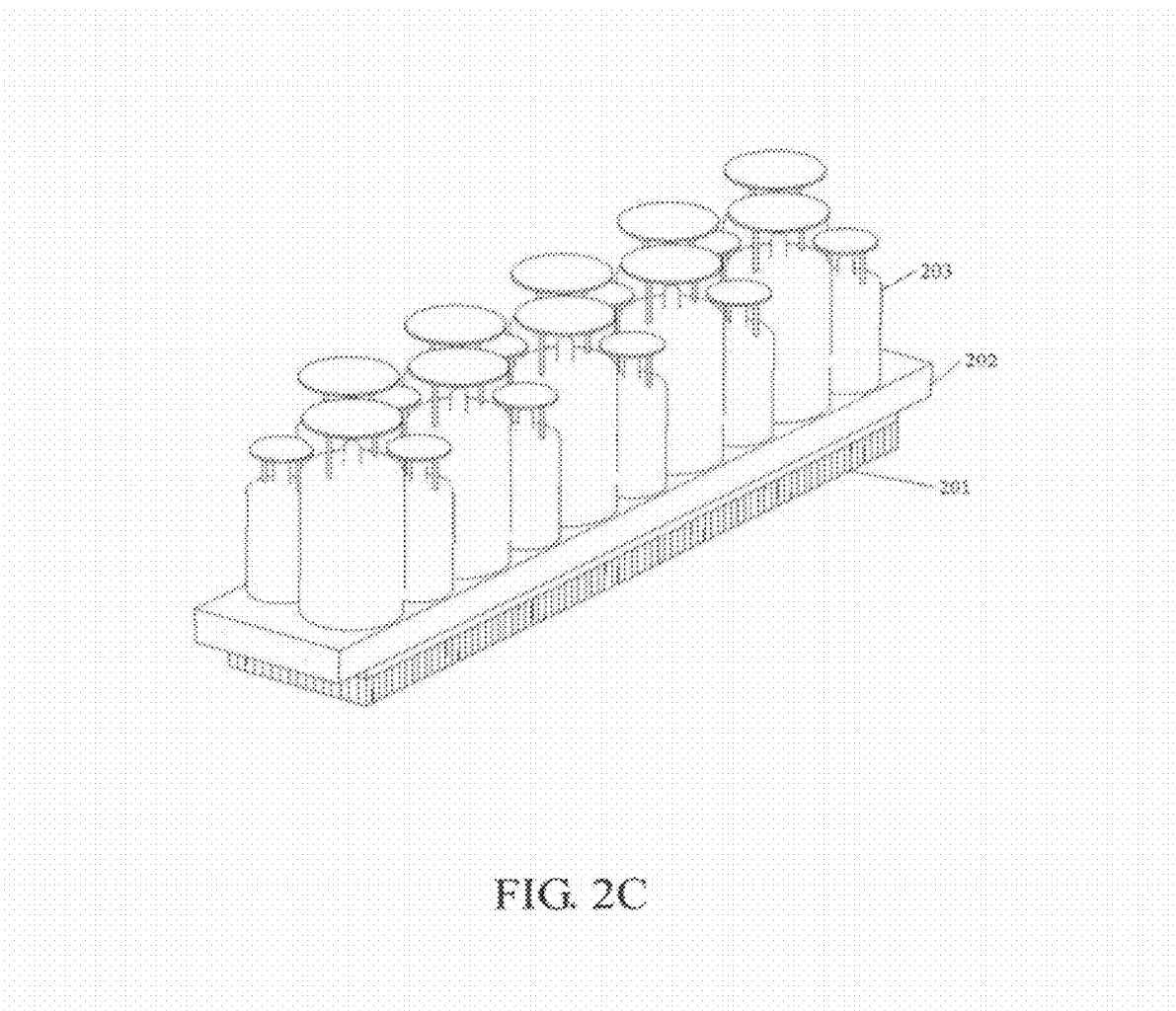

As shown in FIG. 2C, each detector module includes a two-dimensional array of individual detector crystals 201, which absorb the gamma radiation and emit scintillation photons, which are detected by the photomuliplier tubes 203. In an alternative embodiment, a continuous scintillator crystal, such as commonly used in SPECT, can be used. A light guide 202 is disposed between the array of detector crystals and the PMTs. As shown in FIG. 2C, each detector module includes a number of photomultiplier tubes of various sizes, each of which covers a plurality of detector crystals. Each PMT produces an analog signal which rises sharply when a scintillation event occurs, and then tails off exponentially. The photons emitted from one detector crystal can be detected by more than one PMT. However, based on the analog signal produced at each PMT, the detector crystal corresponding to an event can be determined.

The detector module shown in FIG. 2C is narrow and long. Typically, the long axis is more than 3-4 times longer than the short axis. This design minimizes the ratio of edge crystals to interior crystals and still produces a large enough multiplicity of independent modules to ensure an adequate counting capacity. When optically isolated, the entire array can be calibrated independently. However, the concepts related to variable lightguide thickness and tilted PMTs as described herein are applicable to detector modules having other dimensions.

Embodiments of the present invention introduce two new variables in the design of the photosensors/crystal array combination. The first variable is depth. The ability to change the distance between the PMT face and/or the photocathode can change the overall solid angle a PMT can see.

Figure 3A:
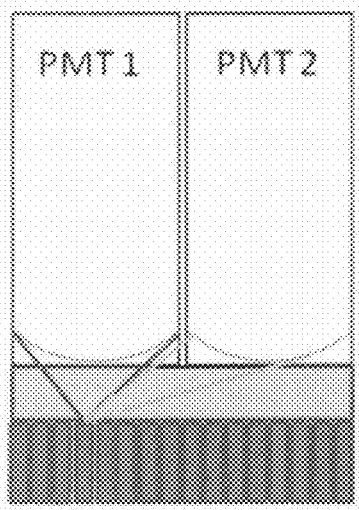
FIGS. 3A and 3B illustrate a PET detector module design showing the positional relationship between a crystal array, a light guide, and photomultiplier tubes according to an embodiment of the present invention.
Figure 3B:
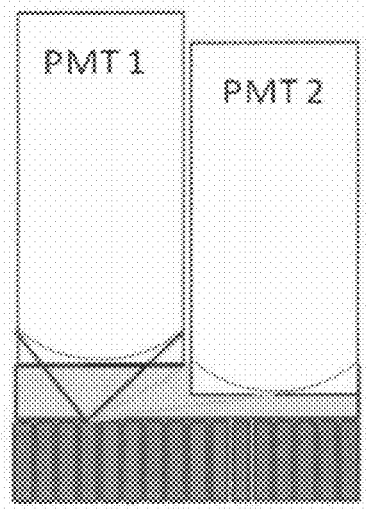

As shown FIG. 3A, the light emitted from the crystal of interest to PMT1 and PMT2 on a standard flat light guide produces a very low signal on PMT2. In FIG. 3B, the signal at PMT2 can be increased by lowering PMT2 into the light guide. The combination of a better solid angle and the curved photocathode significantly increases the detected light by PMT2. If the crystal of interest is below PMT2, the situation is reversed and PMT1 would receive less light.

Figure 4A:
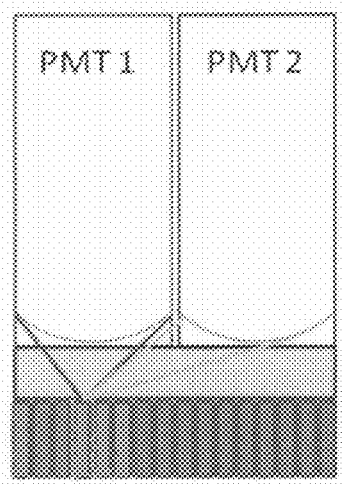
FIGS. 4A and 4B illustrate a PET detector module design showing the positional relationship between a crystal array, a light guide, and photomultiplier tubes according to another embodiment of the present invention.
Figure 4B:
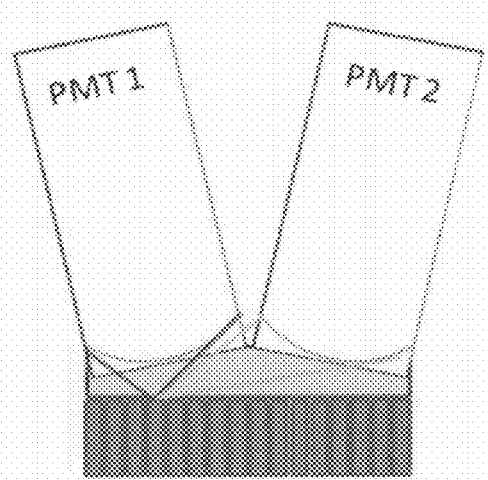

The second variable introduced in embodiments of the present invention is a tilt angle. As shown in FIGS. 4A and 4B, by tilting PMT1 and PMT2, the variation in the signal the photosensors are receiving when the scintillating crystal of interest is located at one side of the array versus the other side can be balanced, providing an overall better set of signals to perform data analysis.

As it is clear from this example, the presence of the edge is the reason the tilt provides a more uniform response for the collection of light by the PMTs. If, for example, the same two PMTs were located on a larger crystal array so that a crystal can emit light from the left-hand side of PMT1 and/or the right-hand side of PMT2, tilting would not be necessary.

Figure 5:
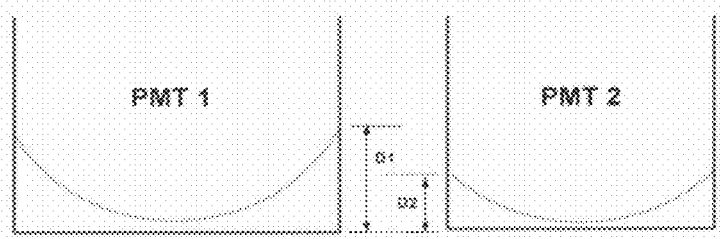
FIG. 5 illustrate two PMTs of different sizes.

Another condition creating asymmetry in light collection is the use of different sizes of PMTs. As shown in FIG. 5, in which 1" and 1.5" PMT tubes are used, one can increase the response of the smaller tube when the crystal of interest in located below the larger tube.

Figure 6:
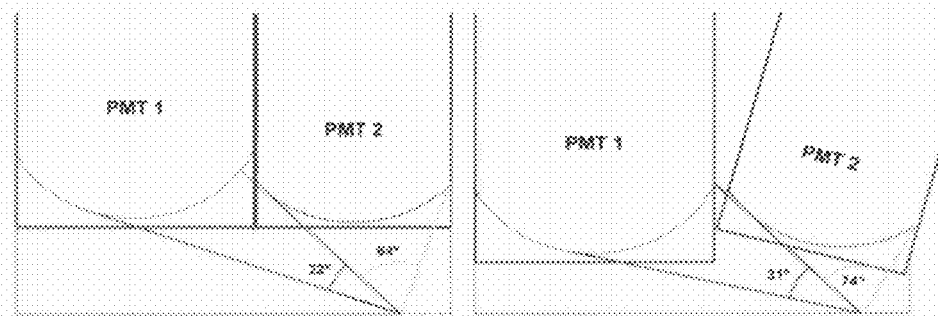
FIGS. 6 and 7 illustrates a PET detector module design showing the positional relationship between a crystal array, a light guide, and photomultiplier tubes according to another embodiment of the present invention.

A more detailed description of the two types of tubes and the arrangement of the photocathode is provided in FIG. 6. In order to optimize the amount of light detected, the complete surface of the photocathode should be exposed all the time. Thus, as shown in FIG. 5, PMT1 needs to be closer to the crystal plane by a distance d=D1−D2, otherwise the PMT2 will shadow light when the source of light is on the right-hand side of the array. Once PMT1 is located at the proper distance from the crystal array, tilting PMT2 will have the effect of increasing the solid angle (i.e., the amount of light) to PMT2, without reducing the solid-angle to PMT1, as shown in FIG. 6. In a preferred embodiment, D1 is typically 8.2 mm and D2 is typically 5.5 mm, although these values will vary based on the sizes of the PMTs.

Various embodiments employing this concept were tested in which the geometry was calculated before and after an adjustment in depth and angle of a PMT. In the example shown in FIG. 6 with the light source on the right-hand side of the crystal array, the angle to PMT1 increases from 22 to 31 degrees while, at the same time, the angle to PMT2 in increases from 64 to 74 degrees. In the example shown in FIG. 7 with the light source on the left-hand side of the crystal array, the angle to PMT1 increases from 68 to 83 degrees while, at the same time, the angle to PMT2 increases from 24 to 28 degrees.

In these examples, the combination of the distance from the photocathode to the crystal plane and the angle the photocathode is making with respect to the same crystal plane allows for a better utilization of the photocathode, and results in better signal quality.

Figure 7:
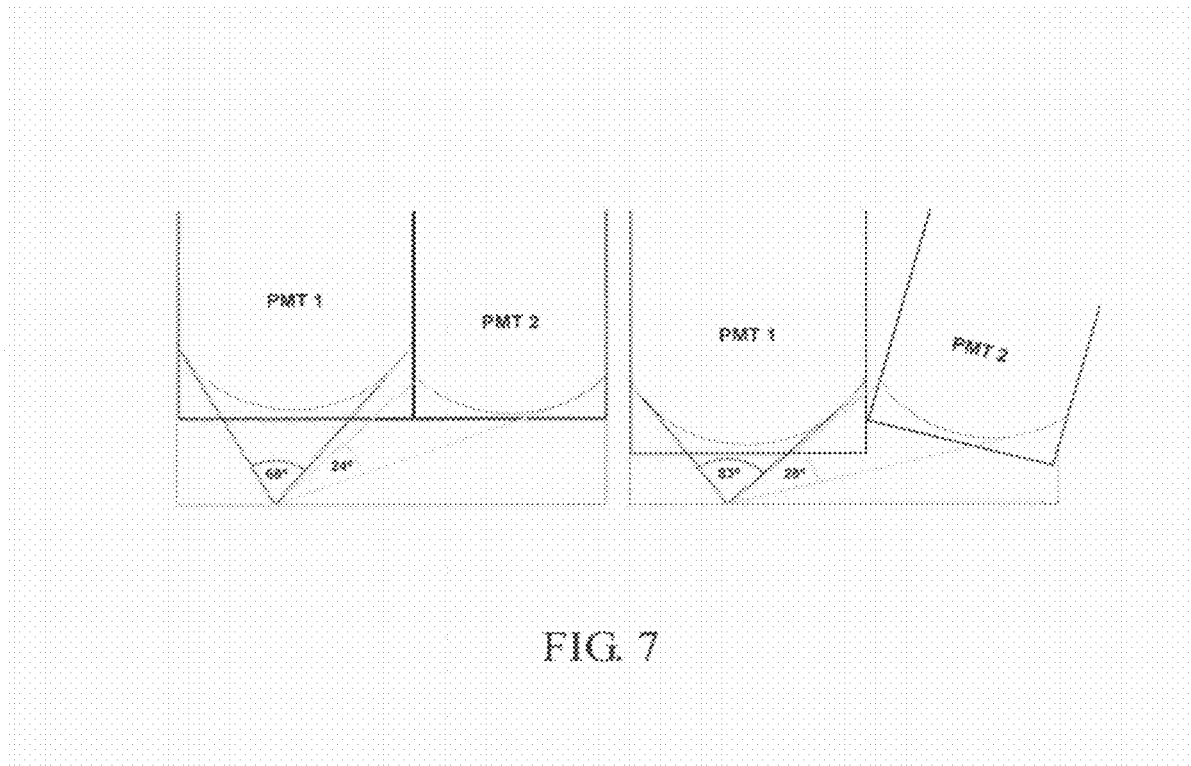

The tilt angle shown in FIGS. 6 and 7 is constrained by the angle between adjacent detector modules. For example, in a preferred embodiment, 36 to 40 detector modules are arranged in a ring so that the tilting constraint is 9 to 10 degrees. Alternative designs will have other corresponding limitations.

Figure 8:
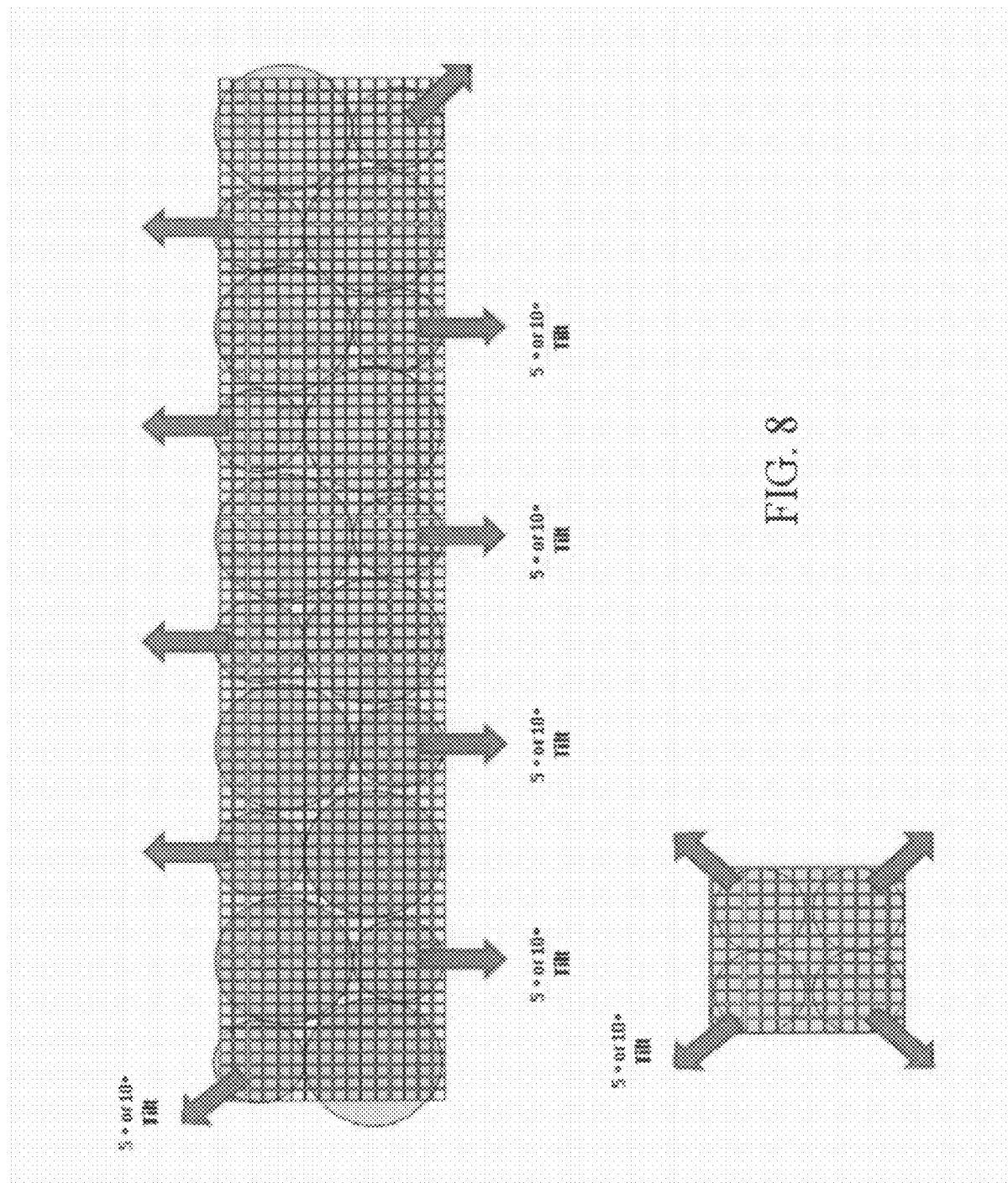
FIG. 8 illustrates a tilting arrangement for PMTs arranged on different detector modules.

FIG. 8 illustrates an example configuration in which two sizes of PMTs are arranged over an array of crystal elements. As shown in the figure, the smaller-sized PMTs are tilted at 5 degrees, but can be tilted up to 10 degrees in this example. Further, the smaller-sized PMTs on the two ends can be tilted diagonally, as shown in FIG. 8. In the second example shown in FIG. 8, the block design has four PMTs of the same size arranged on a crystal array, with each of the PMTs tilted diagonally.

Various alternative embodiments of PMT depth and tilt angle are possible depending on the precise description of the PMT being used and the specific crystal layout, light guide thickness, positioning algorithm, etc.

Embodiments of the present invention provide additional variables to optimize and balance the amount of light received from a crystal array by photosensors (PMTs). In turn, the ability to better control the light distribution to the various PMTs allows for better compensation of the inherent asymmetries (e.g., edges and changes in PMT size or types) in the overall arrangement. In addition, these variables also allow for a more efficient use of the curved photocathode, and therefore maximize the total amount of light detected.

The invention claimed is:
1. A gamma ray detector module, comprising:
   at least one crystal element arranged in a plane;
   a plurality of light sensors arranged to cover the at least one crystal element and configured to receive light emitted from the at least one crystal element, the plurality of light sensors including end light sensors arranged at respective ends of the detector module and interior light sensors arranged between the end light sensors; and a light guide arranged between the at least one crystal element and the plurality of light sensors, the light guide being optically connected to the at least one crystal element, wherein the light guide positions at least one of the interior light sensors farther away from the plane of the at least one crystal element than at least one of the end light sensors.

2. The gamma ray detector module of claim 1, wherein the plurality of light sensors include first light sensors each having a first size, and second light sensors, each second light sensor being adjacent to one of the first light sensors and having a second size, so that the first and second light sensors cover different-sized portions of the at least one crystal element, the first size being larger than the second size.

3. The gamma ray detector module of claim 2, wherein the light guide further includes angled recessed portions that position the second light sensors at an oblique tilt angle with respect to the first light sensors and the plane of the at least one crystal element.

4. The gamma ray detector module of claim 2, wherein the first light sensors are positioned closer to the plane of the at least one crystal element by a distance d, wherein d is based on a difference in sizes of the first and second light sensors.

5. The gamma ray detector module of claim 2, wherein the plurality of light sensors are arranged in a two-dimensional array covering the at least one crystal element, and a light sensor of the first size is arranged adjacent to two light sensors of the second size.

6. The gamma ray detector module of claim 1, wherein the at least one crystal element includes a plurality of optically isolated crystal elements.

7. A gamma ray detector module, comprising:
at least one crystal element arranged in a plane;
a plurality of light sensors arranged to cover the at least one crystal element and configured to receive light emitted from the at least one crystal element, each light sensor including a photocathode having a curved bottom surface facing the at least one crystal element; and
a light guide arranged between the at least one crystal element and the plurality of light sensors, the light guide being optically connected to the at least one crystal element,
wherein the plurality of light sensors include a first light sensor having a first size and a second light sensor adjacent to the first light sensor and having a second size, so that the first and second light sensors cover different-sized portions of the at least one crystal element, the first size being smaller than the second size; and
the light guide positions the first and second light sensors so that a maximum distance of the bottom surface of the photocathode of the first light sensor from the plane of the at least one crystal element is equal to a maximum distance of the bottom surface of the photocathode of the second light sensor from the plane of the at least one crystal element.

8. The gamma ray detector module of claim 7, wherein the at least one crystal element includes a plurality of optically isolated crystal elements.

9. A gamma ray scanner system, comprising:
a plurality of rectangular detector modules arranged adjacent to one another to form a cylindrical detector ring, wherein each of the detector modules includes
at least one crystal element arranged in a plane;
a plurality of light sensors arranged to cover the at least one crystal element and configured to receive light emitted from the at least one crystal element, each light sensor including a photocathode having a curved bottom surface facing the at least one crystal element; and
a light guide arranged between the at least one crystal element and the plurality of light sensors, the light guide being optically connected to the at least one crystal element,
wherein the plurality of light sensors include a first light sensor having a first size and a second light sensor adjacent to the first light sensor and having a second size, so that the first and second light sensors cover different-sized portions of the at least one crystal element, the first size being smaller than the second size; and
the light guide positions the first and second light sensors so that a maximum distance of the bottom surface of the photocathode of the first light sensor from the plane of the at least one crystal element is equal to a maximum distance of the bottom surface of the photocathode of the second light sensor from the plane of the at least one crystal element.

* * * * *